(12) United States Patent
Asente et al.

(10) Patent No.: US 9,105,117 B2
(45) Date of Patent: Aug. 11, 2015

(54) METHODS AND APPARATUS FOR COHERENT MANIPULATION AND STYLIZATION OF STEREOSCOPIC IMAGES

(71) Applicant: Adobe Systems Incorporated, San Jose, CA (US)

(72) Inventors: Paul Asente, Redwood City, CA (US); Lesley Ann Northam, Picton (CA)

(73) Assignee: Adobe Systems Incorporated, San Jose, CA (US)

( * ) Notice: Subject to any disclaimer, the term of this patent is extended or adjusted under 35 U.S.C. 154(b) by 184 days.

(21) Appl. No.: 13/675,455

(22) Filed: Nov. 13, 2012

(65) Prior Publication Data

US 2013/0136337 A1 May 30, 2013

Related U.S. Application Data

(60) Provisional application No. 61/565,368, filed on Nov. 30, 2011.

(51) Int. Cl.
| | |
|---|---|
| *G06K 9/00* | (2006.01) |
| *G06T 15/00* | (2011.01) |
| *G06T 11/00* | (2006.01) |
| *G06T 19/20* | (2011.01) |

(52) U.S. Cl.
CPC ............... *G06T 15/00* (2013.01); *G06T 11/001* (2013.01); *G06T 19/20* (2013.01); *G06T 2219/2024* (2013.01)

(58) Field of Classification Search
USPC ................. 382/103, 154, 209, 219, 284, 294; 348/42, 82, 142
See application file for complete search history.

(56) References Cited

U.S. PATENT DOCUMENTS

| | | | | |
|---|---|---|---|---|
| 6,959,248 | B2 * | 10/2005 | Gard et al. | 702/22 |
| 6,985,172 | B1 * | 1/2006 | Rigney et al. | 348/149 |
| 7,151,447 | B1 * | 12/2006 | Willms et al. | 340/540 |
| 7,398,057 | B2 * | 7/2008 | Stefani et al. | 455/68 |
| 7,813,540 | B1 * | 10/2010 | Kraft | 382/143 |
| 8,471,898 | B2 * | 6/2013 | Neuman | 348/51 |
| 8,502,862 | B2 * | 8/2013 | Turner et al. | 348/46 |
| 2011/0080466 | A1 | 4/2011 | Kask et al. | |
| 2011/0310982 | A1 | 12/2011 | Yang et al. | |
| 2013/0129194 | A1 * | 5/2013 | Gusis et al. | 382/154 |

OTHER PUBLICATIONS

Kooi FL, Toet A. Visual comfort of binocular and 3D displays. Displays 2004;25(2¢3):99-108.

(Continued)

*Primary Examiner* — Wesley Tucker
(74) *Attorney, Agent, or Firm* — Wolfe-SBMC

(57) ABSTRACT

Methods and apparatus for coherent manipulation and stylization of stereoscopic images. A stereo image manipulation method may use the disparity map for a stereo image pair to divide the left and right images into a set of slices, each of which is the portion of the images that correspond to a certain, small depth range. The method may merge the left and right slices for a depth into a single image. The method may then apply a stylization technique to each slice. The method may then extract the left and right portions of each stylized slice, and stack them together to create a coherent stylized stereo image. As an alternative to first extracting slices from a merged image and then applying a stylization technique to the slices, the method may first apply the stylization technique to the merged image and then extract slices from the stylized merged image.

20 Claims, 21 Drawing Sheets

(56) References Cited

OTHER PUBLICATIONS

Benoit A, Le Callet P, Campisi P, Cousseau R. Quality assessment of stereoscopic images. In: EURASIP Journal on Image and Video Processing. 2008, p. 1-13.

Richardt C, Swirski L, Davies I, Dodgson NA. Predicting stereoscopic viewing comfort using a coherence-based computational model. In: Cunningham D, Isenberg T, editors. Proceedings of Computational Aesthetics (CAe). Aug. 2011.

Litwinowicz P. Processing images and video for an impressionist effect. In: Proceedings of the 24th annual conference on Computer graphics and interactive techniques. SIGGRAPH '97; New York, NY, USA: ACM Press/Addison-Wesley Publishing Co. ISBN 0-89791-896-7; 1997, p. 407-414.

Hertzmann A. Painterly rendering with curved brush strokes of multiple sizes. In: Proceedings of the 25th annual conference on Computer graphics and interactive techniques. SIGGRAPH '98; New York, NY, USA: ACM. ISBN 0-89791-999-8; 1998, p. 453-460.

Hays J, Essa IA. Image and video based painterly animation. In: Proceedings of the 4th international symposium on Non-photorealistic animation and rendering. 2004, p. 113-120.

Stavrakis E, Gelautz M. Image-based stereoscopic painterly rendering.Eurographics Symposium on Rendering, 2004.

Gelautz M, Stavrakis E, Bleyer M. Stereo-based image and video analysis for multimedia applications. Technology 2004;35:998-1004.

Stavrakis E, Gelautz M. Stereoscopic painting with varying levels of detail. In Proceedings of SPIE—Stereoscopic Displays and Virtual Reality Systems XII. 2005, p. 55-64.

E. Stavrakis, M. Bleyer, D. Markovic and M. Gelautz, "Image-Based Stereoscopic Stylization" IEEE International Conference on Image Processing, 2005.

Snavely N, Zitnick CL, Kang SB, Cohen M. Stylizing 2.5-D video. In: Proceedings of the 4th international symposium on Non-photorealistic animation and rendering. NPAR '06; New York, NY, USA: ACM. ISBN 707 1-59593-357-3; 2006, p. 63-69.

D. M. Tokunaga, C. G. Correa, R. Nakamura, F. L. S. Nunes, R. Tori, "Non-Photorealistic Rendering in Stereoscopic 3D Visualization" SIGGRAPH Posters 2010.

Meier BJ. Painterly rendering for animation. In: Proceedings of the 23rd annual conference on Computer graphics and interactive techniques. SIGGRAPH '96; New York, NY, USA: ACM. ISBN 0-89791-746-4;1996, p. 477-484.

Schmid J, Senn MS, Gross M, Sumner RW. Overcoat: an implicit canvas for 3D painting. In: ACM SIGGRAPH 2011 papers. SIGGRAPH '11; New York, NY, USA: ACM. ISBN 978-1-4503-0943-1; 2011, p. 28:1-28:10. Aug. 2011.

Kolmogorov V, Zabih R. Multi-camera scene reconstruction via graph cuts. In: in European Conference on Computer Vision. 2002, p. 82-96.

* cited by examiner

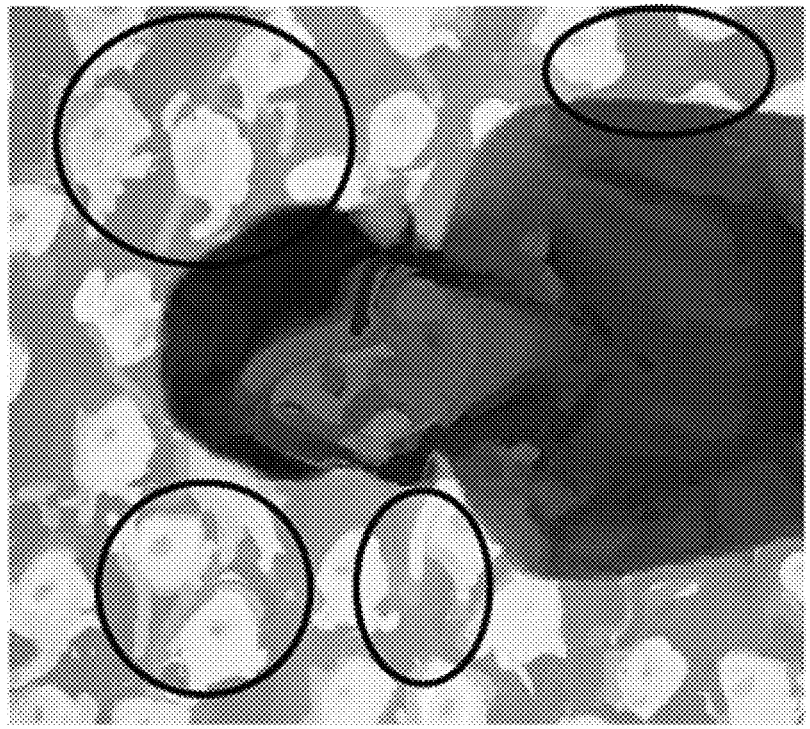
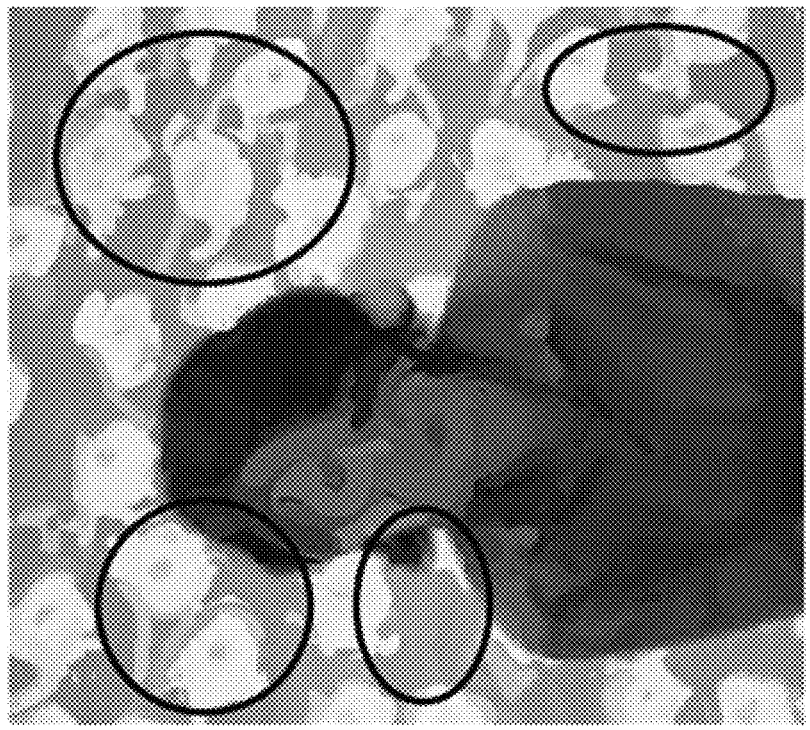
FIG. 1
Prior Art

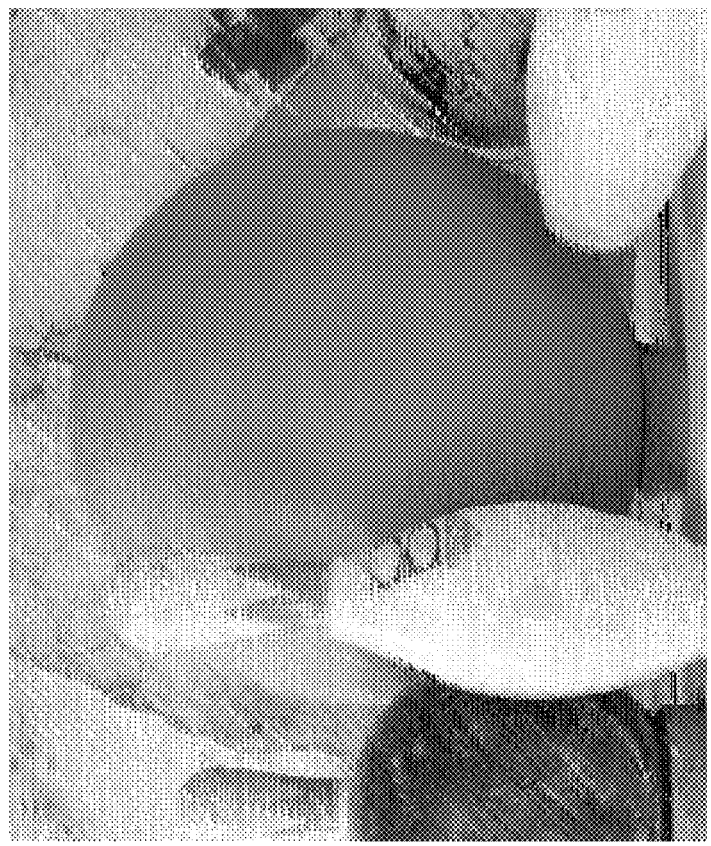

METHODS AND APPARATUS FOR COHERENT MANIPULATION AND STYLIZATION OF STEREOSCOPIC IMAGES

PRIORITY INFORMATION

This application claims benefit of priority of U.S. Provisional Application Ser. No. 61/565,368 entitled "Methods and Apparatus for Coherent Manipulation and Stylization of Stereoscopic Images" filed Nov. 30, 2011, the content of which is incorporated by reference herein in its entirety.

BACKGROUND

Synthetic Painting Techniques

A synthetic painting technique is a digital image processing technique that attempts to apply some painting style (e.g., mosaic, pointillist, rough pastel, etc.) to digital images, for example digital photographs. For example, a "painterly" rendering technique is described by Hertzmann (Aaron Hertzmann. Painterly Rendering with Curved Brush Strokes of Multiple Sizes. In *SIGGRAPH* 98 *Conference Proceedings*, pages 453-460, July 1998.) Hertzmann describes an algorithm for converting a photographic image into a somewhat impressionistic painting. Hertzmann's technique has inspired many refinements, but remains the most commonly used painterly rendering technique.

Manipulating Stereoscopic Images

Stereoscopic images consist of a pair of images that correspond to the left and right eye views of a scene. Manipulating these two images independently can produce an image that can no longer be fused into a stereo image because of inconsistencies. For example, conventional techniques for applying painting algorithms and stylization techniques to stereo images produce results with many inconsistencies. Conventional approaches to such stylization techniques for stereo images have applied brush strokes to one image, used a disparity map to translate the strokes to the other image's viewpoint, and finally filled in unpainted areas in the second image with new strokes. However, because these new strokes are only visible in one view, inconsistencies may arise. For example, FIG. 1 shows results of a conventional "painterly" rendering technique applied to a stereo image pair. As indicated by the circled regions in FIG. 1, there are many inconsistent regions between the two views, at least some of which may be due to exaggerated stroke length. For example, the stroke length may not reflect the feature size, and long strokes may wander into undesirable regions.

SUMMARY

Various embodiments of methods and apparatus for coherent manipulation and stylization of stereoscopic images are described. Embodiments of a method for manipulating stereo images are described that may be referred to as a stereo image manipulation method. In at least some embodiments, the stereo image manipulation method may use the disparity map for a stereo image pair to divide the left and right images into a set of slices, each of which is the portion of the images that correspond to a certain, small depth range. The method may merge the left and right slices for a depth into a single image. This may be done by creating a combined mask, and applying it to a merged entire image. Alternatively, this may be done by extracting the slices for the left and right images, and then merging them. The method may then apply a stylization technique to each slice. The method may then extract the left and right portions of each stylized slice, and stack them together to create a coherent stylized stereo image.

At least some embodiments of the stereo image manipulation method may allow the stylization of a slice to extend into areas that will be covered up by closer slices, to give the stylization algorithm more freedom. If the method has more of the image to work with, it may in at least some cases do a better job. At least some embodiments of the stereo image manipulation method may allow the stylization algorithm to use parts of the image outside of the slice as input, if this does not cross a depth discontinuity. At least some embodiments of the stereo image manipulation method may enhance a stylization technique, for example Hertzmann's algorithm, by using the object edges (detected by depth discontinuities) to enhance the image gradients along edges of objects in the picture, thereby encouraging brush strokes to follow the edges.

In at least some embodiments, different stylization techniques or combinations thereof may be applied to different ones of the layers, or different stylizations using the same technique may be applied to different ones of the layers. In addition, some layers may be stylized, while other layers are left unstylized.

In at least some embodiments, the stereo image manipulation method may be used to synthesize intermediate views that are between the left and right original views of the stereo image pair. For example, the method may generate the slices, and then stack the center portion of each slice to generate a synthetic viewpoint halfway between the original left and right views. By taking the appropriate portions of the slices, any viewpoint between the left and right views may be synthesized. This intermediate view synthesis can be done with or without stylizing the layers.

In at least some embodiments, as an alternative to first extracting slices from a merged image and then applying a stylization technique to the slices, the stereo image manipulation method may first apply the stylization technique to the merged image and then extract stylized slices from the stylized merged image. The method may then extract the left and right portions of each stylized slice and stack the left portions together and the right portions together to create a coherent stylized stereo image including a left stylized image and a right stylized image.

Although the stereo image manipulation methods are primarily described as using a painting algorithm or painting tool (e.g., Hertzmann's algorithm or variations thereof) for image stylization, the method may have widespread applicability to manipulation of stereo images, including but not limited to stylization filters, a healing brush, and other local modification tools.

BRIEF DESCRIPTION OF THE DRAWINGS

FIG. 1 shows results of a conventional "painterly" rendering technique applied to a stereo image pair.

FIGS. 14A-14B, 15A-15B, and 16A-16B show some examples of stereo 3D stylization using example digital image processing filters (mosaic, Pointillist, and rough pastel, respectively) and the layered approach to stereo image enhancement provided by embodiments of the stereo image manipulation method.

Figure 2:
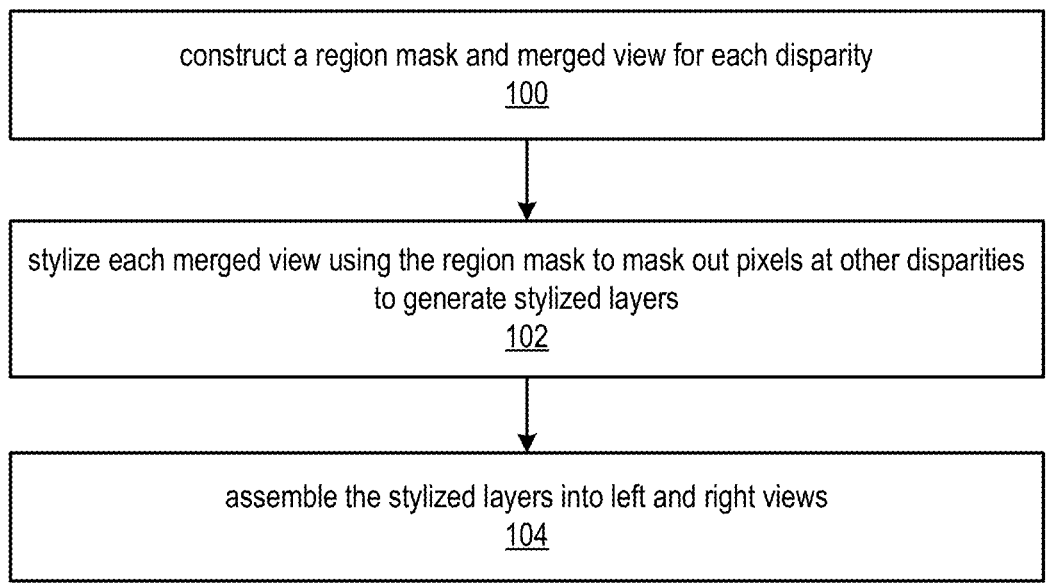
FIG. 2 is a high-level flowchart of a stereo image manipulation method, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for coherent manipulation and stylization of stereoscopic images are described. Embodiments of a method for manipulating stereo images are described that may be referred to as a stereo image manipulation method. Embodiments of the stereo image manipulation method may maintain consistency between the two views of a stereo image pair when performing image enhancements using various stylization, painting, filtering, or other techniques. Embodiments of the stereo image manipulation method may, for example, be applied to the problem of stereoscopic image stylization and, in particular, painting algorithms.

In at least some embodiments, the stereo image manipulation method may use disparity maps for a pair of stereo images to segment the left and right images into planes or slices, each of which represents the portion of the images that are at a particular, small range of depths. The method then merges the left and right segments at each of two or more particular depths into a single image at the respective depth, using the disparity to determine their horizontal offset. The method then applies a painting algorithm independently to each depth layer, and reassembles the stylized layers into a new pair of images. Because the stylization is done once for each depth range, instead of once for each image, the left and right views remain coherent. The stereo image manipulation method effectively stacks up the stylized layers into a 3D structure and views it from two different angles.

Figure 10A:
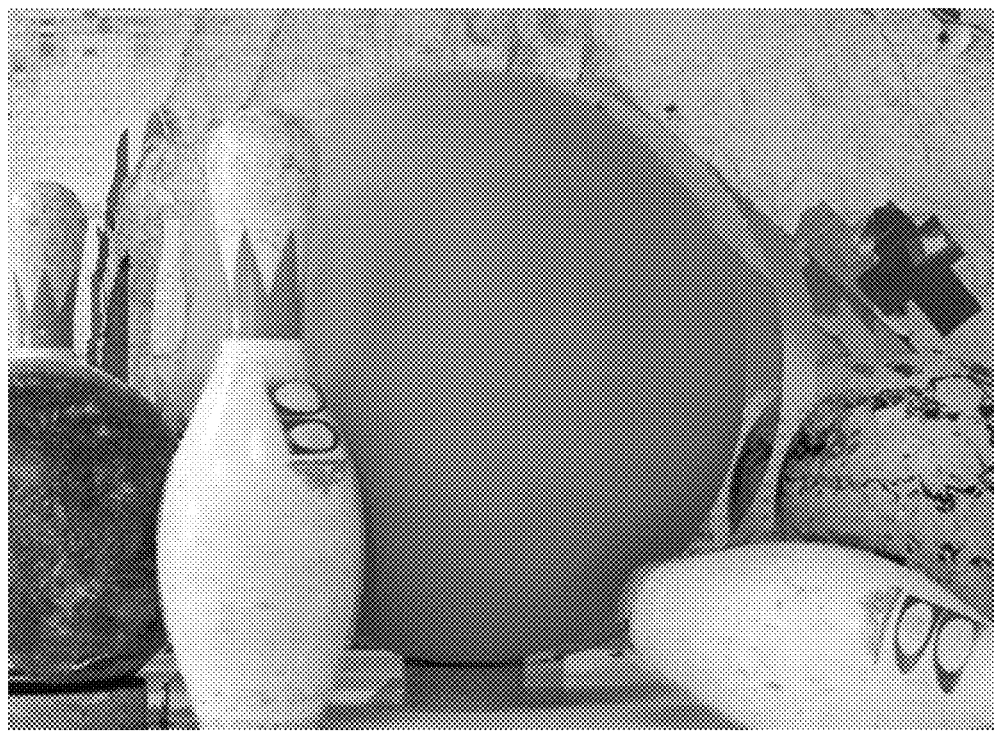
FIG. 10A shows the original left and right images of FIGS. 6A and 6B overlaid on each other with a 37-pixel shift, according to at least some embodiments.

At least some embodiments of the stereo image manipulation method may construct a merged image for each disparity, or small range of disparities, by combining images or slices extracted from the left and right images at the respective disparity or range of disparities. In at least some embodiments, this combination may be performed by shifting one image horizontally by the disparity amount, and then combining the two images into a single image. In combining the two images, pixel values at corresponding pixels may be overlaid; for example, the pixel values may be averaged or otherwise combined. Because the disparity indicates how much to shift horizontally from one image to get the corresponding pixel in the other image, areas of the images that have the respective disparity match up well, while other areas of the images that have other disparities tend to look doubled. For example, FIG. 10A shows an example merged image for disparity 37, which corresponds to the depth at the upright bowling pin. Thus, that part of the merged image appears normal (not doubled), while other parts of the merged image appear doubled.

The above describes a technique in which slices are first extracted from a merged image, and then a stylization technique is applied to the slices. However, for some stylization techniques, the stylization technique may produce better results by first applying the stylization technique to the merged image, and then extracting stylized slices from the stylized merged image. Thus, in at least some embodiments, as an alternative to first extracting slices from a merged image and then applying a stylization technique to the slices, the stereo image manipulation method may first apply the stylization technique to the merged image and then extract stylized slices from the stylized merged image. The method may then extract the left and right portions of each stylized slice and stack the left portions together and the right portions together to create a coherent stylized stereo image including a left stylized image and a right stylized image.

In at least some embodiments of the stereo image manipulation method, the disparity map for a stereo image pair to divide the left and right images of the stereo image pair into a set of slices, each of which is the portion of the images that correspond to a certain, small depth range. The method may merge the left and right slices for a depth into a single image. This may be done by creating a combined mask, and applying it to a merged entire image. Alternatively, this may be done by extracting the slices for the left and right images, and then merging the slices using the disparity to determine their horizontal offset. The method may then apply a stylization technique to each slice. The method may then extract the left and right portions of each stylized slice, and stack the left portions together and the right portions together to create a coherent stylized stereo image including a left stylized image and a right stylized image.

Embodiments of the stereo image manipulation method may allow the stylization of a slice to extend into areas that will be covered up by closer slices, to give the stylization algorithm more freedom. If the method has more of the image to work with, it may in at least some cases do a better job. Embodiments of the stereo image manipulation method may allow the stylization algorithm to use parts of the image outside of the slice as input, if this does not cross a depth discontinuity. Embodiments of the stereo image manipulation method may enhance a stylization technique (e.g., Hertzmann's algorithm) by using the object edges (detected by depth discontinuities) to enhance the image gradients along edges of objects in the picture, thereby encouraging brush strokes to follow the edges.

Although the stereo image manipulation methods are primarily described herein as using a painting algorithm or painting tool (e.g., Hertzmann's algorithm or variations thereof) for image stylization, the method may have widespread applicability to manipulation of stereo images, including but not limited to stylization filters, a healing brush, blur tools, and other local modification tools.

Disparity Maps

A stereoscopic 3D image consists of two images called the left view and the right view, corresponding to the views of a scene from the left and right eyes. For each of these views there is an associated disparity map (also referred to as a depth map). For a stereo pair of images, disparity maps are derived images that describe the distance between the left and right images for some feature. There is one disparity map for the left image, and one disparity map for the right image. The values in a disparity map give, for each pixel in the image, the distance one must move left or right to find the corresponding pixel in the other image. This distance is called the disparity at that pixel, and the disparity is inversely proportional to depth. If a point in the scene is visible in both views, it is typically expected the corresponding pixels to have equal but opposite disparities. For example, assume that the tip of someone's nose is three pixels further to the right in the right image than it is in the left image. The disparity value in the left disparity for that pixel would be 3, and the disparity value in the right disparity map for that pixel would be −3. For any pixel in one if the stereo images, the disparity map may generally be examined to find the corresponding pixel in the other image. However, some disparity values may be undefined in one or both views, for example when a pixel in one view corresponds to a point in the scene that is occluded in the other view.

Disparity maps may also be referred to as depth maps because depth varies inversely with disparity: there is some distance from the viewer at which disparity is zero. For things closer than that distance, disparities will become increasingly positive (or negative, depending upon the convention) and for things farther than that distance, disparities will become increasingly negative (or positive). From the disparity, the depth can be calculated; conversely, if the depth is known, the disparity can be calculated.

Disparity maps are typically presented as grayscale images. See, for example, FIGS. 7A and 7B. To generate the grayscale images, the disparity values may be scaled to be more visible. Thus, disparity maps generally come with a scale factor, and, since disparities can be positive or negative, an offset that is added to get the true disparity.

There may also be areas in a disparity map that are undefined. In a stereo image pair, there are often areas that can be seen only in one image because the areas are behind the edge of (or occluded by) something that is closer. For a pixel in one of these areas, there is no way to compute the corresponding pixel, because shifting by an amount corresponding to the pixel's depth would result in moving onto something that is closer to the viewer. Typically, these areas are extrapolated into by using the disparity (depth) information of whatever neighboring area is further away from the viewer.

Figure 6A:
FIGS. 6A and 6B show original left and right views of an example stereo image, respectively.
Figure 6B:
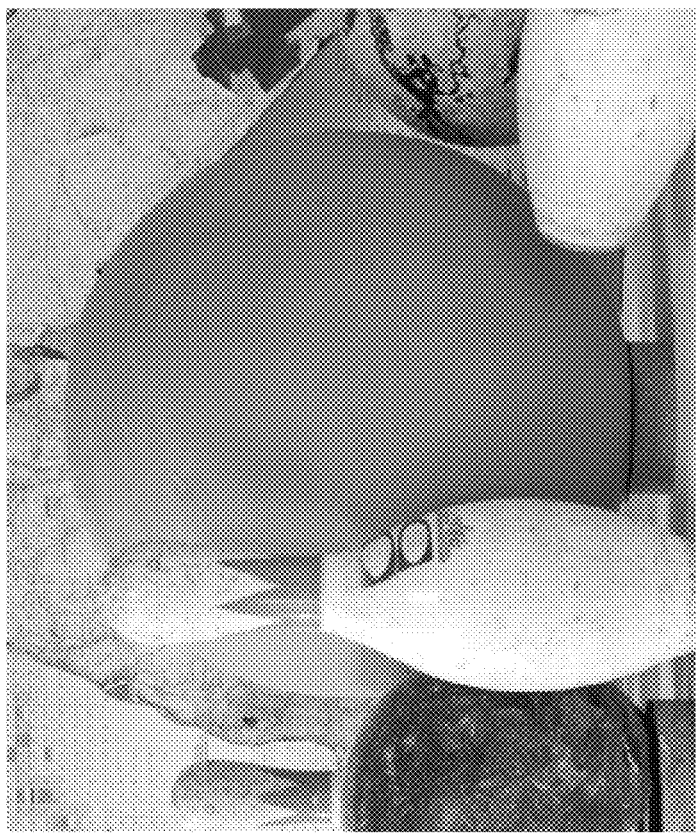
Figure 7B:
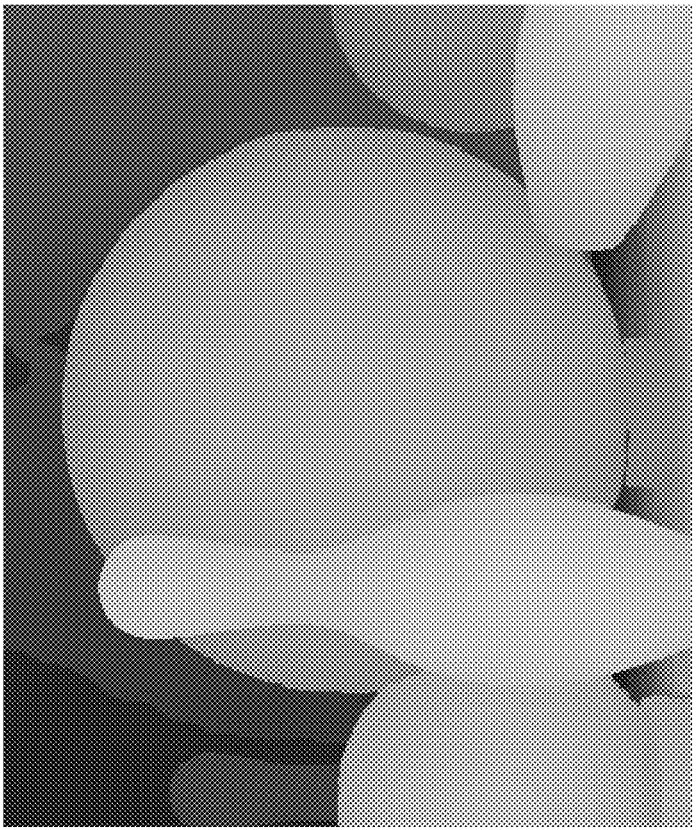
FIGS. 7A and 7B show disparity maps for the left and right views in FIGS. 6A and 6B, respectively, according to at least some embodiments.
Figure 7A:
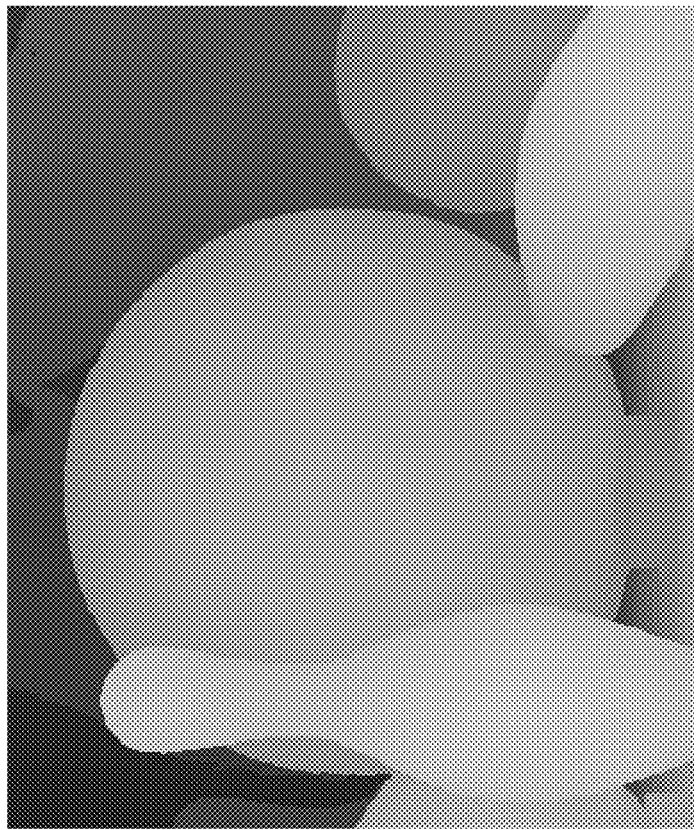

For an example, see the original left and right views of an example stereo image as shown in FIGS. 6A and 6B, respectively. Just to the left of the large ball, some of the background map is visible. However, much more of the background map is visible in the left image of FIG. 6A than in the right image of FIG. 6B; in the right image (FIG. 6B), more is behind the large ball. For those pixels in the left image (FIG. 6A) that are hidden in the right image (FIG. 6B), there are no corresponding pixels—the disparity map is undefined. However, since disparity can be calculated from depth, it may be assumed that these pixels are at the same depth as the neighboring background pixels that do correspond, and the missing map values may be filled in by propagating disparity from these pixels. The result is an original disparity map for the left image as shown in FIG. 7A and an original disparity map for the right image as shown in FIG. 7B. In the disparity maps, lighter values correspond to areas of the image that are closer to the viewer and thus at lower disparity, and darker values correspond to areas that are farther from the viewer and thus at greater disparity.

Stereo Image Manipulation Method

Figure 3:
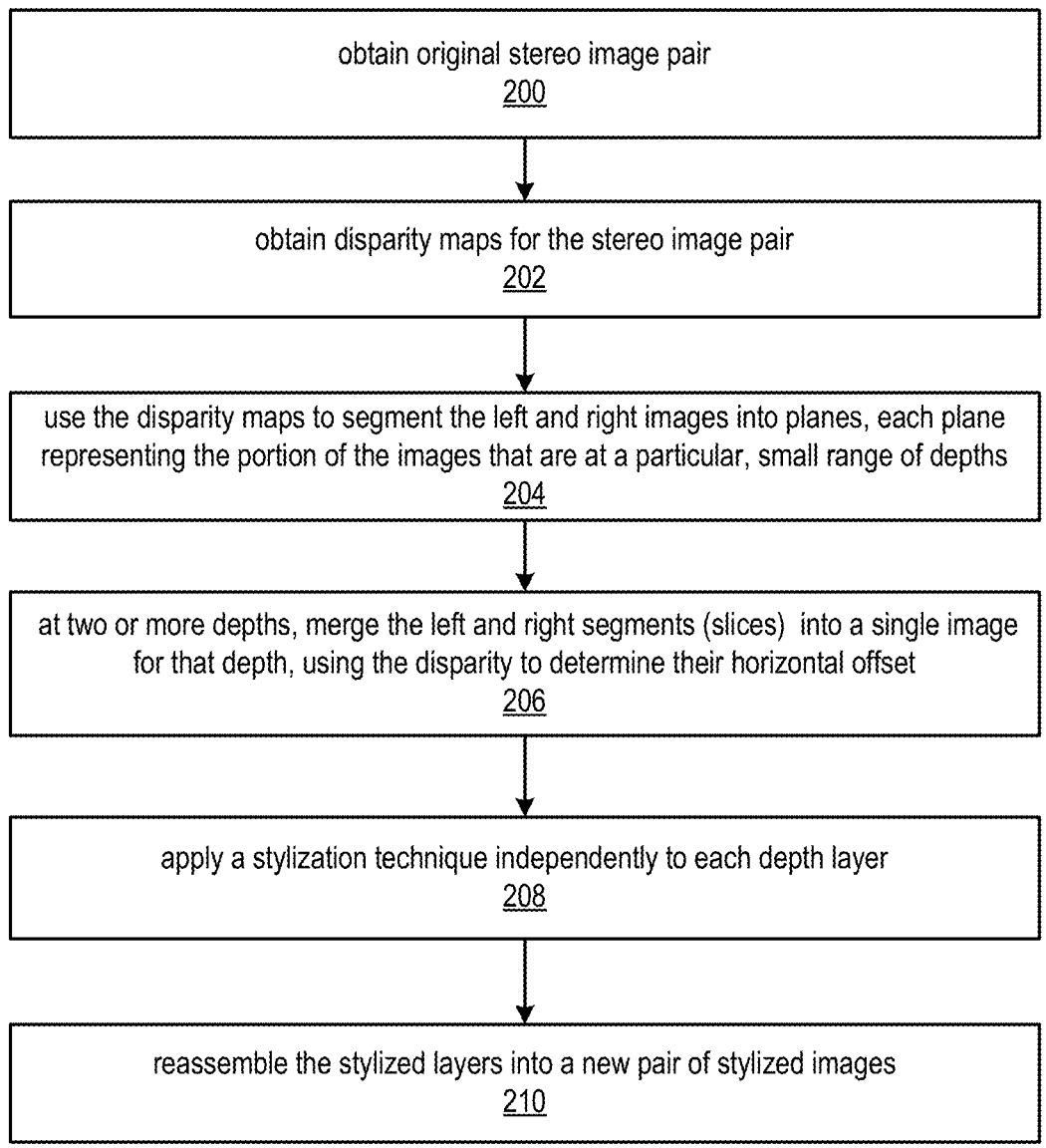
FIG. 3 is a flowchart of a stereo image manipulation method, according to at least some embodiments.

At least some embodiments of the stereo image manipulation method may generate a merged image at each of one or more ranges of depths and then apply a stylization technique. In some embodiments, the stylization is applied to slices extracted at particular depths from the merged images. Left and right portions are then extracted from the stylized slices. The left portions are reassembled to create a left stylized image, and the right portions are assembled to create a right stylized image. Thus, embodiments create a coherent stylized stereo image including the left stylized image and the right stylized image. FIGS. 2 and 3 illustrate a method for stereoscopic 3D stylization that separates image pixels of a particular disparity from the rest of the image prior to stylization, according to at least some embodiments.

FIG. 2 is a high-level flowchart of the stereo image manipulation method, according to at least some embodiments. In at least some embodiments, the method may construct a region mask and merged view for each disparity, as indicated at 100. In at least some embodiments, nearby disparities may be combined if they contain an insignificant number of pixels. As indicated at 102, the method may stylize each merged view. In at least some embodiments, in stylizing each merged view, the corresponding region mask may be used to mask out pixels at other disparities. This generates a plurality of stylized layers. As indicated at 104, the method may assemble the stylized layers into left and right stylized views.

FIG. 3 is a flowchart of the stereo image manipulation method, according to at least some embodiments. As indicated at 200, the method may obtain an input stereo image pair. As indicated at 202, the method may obtain disparity maps for the stereo image pair. As indicated at 204, the method may use the disparity maps for an input pair of stereo images to segment the left and right images into planes, each of which represents the portion of the images that are at a particular, small range of depth. In at least some embodiments, nearby depths may be combined if they contain an insignificant number of pixels As indicated at 206, at each of two or more depths, the method merges the left and right segments into a single image for that depth. The method merges the left and right segments of a particular depth into a single image (referred to as a merged view), using the disparities to determine their horizontal offset. In at least some embodiments, the merging may be done by creating a combined mask (the region mask), and applying it to a merged entire image. Alternatively, the merging may be done by extracting the slices for the left and right images, and then merging the slices using the disparity to determine their horizontal offset.

As indicated at 208, the method then applies a stylization technique independently to each depth layer. The method may receive stylization input according to a stylization technique, for example one or more brush strokes or stylization filter input, and apply the input independently to each layer. In at least some embodiments, different stylization techniques may be applied to different ones of the layers, or different stylizations using the same technique may be applied to different ones of the layers. In addition, some layers may be stylized, while other layers are left unstylized. As an example, a blur method may be applied to two or more layers while varying the amount of blurriness applied at different layers, and possibly not blurring at least one layer, to generate a synthetic depth of field effect.

As indicated at 210, the method then reassembles the stylized layers into a new pair of images. The new pair of images may, for example, be combined to produce a painted stereo image or anaglyph. Note that elements 204 through 208 may be repeated to perform additional stylizations of the input stereo image pair.

In at least some embodiments, after reconstructing the left and right views, the left and right views can be converted to an anaglyph or other 3D image format. In at least some embodiments, the method reconstructs a stack of matted images, and uses isometric projections along the left and right borders of the stack as the left and right views. Because these views are of the same 3D scene, they are guaranteed to be consistent. See FIG. 4, which shows a stack of stylized layers, viewed from their top edges, according to at least some embodiments. The leftmost and rightmost portions of each stylized layer are composited to create the stylized left and right views.

Embodiments of the stereo image manipulation method as illustrated in FIGS. 2 and 3 and described above are further described below in reference to FIGS. 5A through 15B.

Figure 5A:
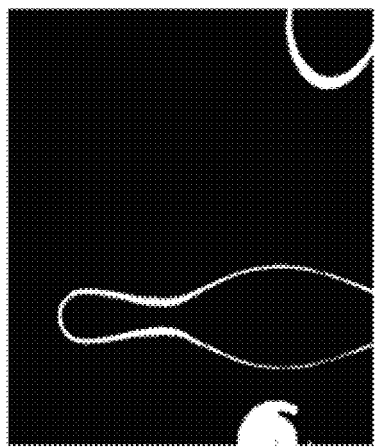
FIGS. 5A through 5F show examples of a sample mask, merged view, and merged disparity map for a given disparity, according to at least some embodiments.
Figure 5B:
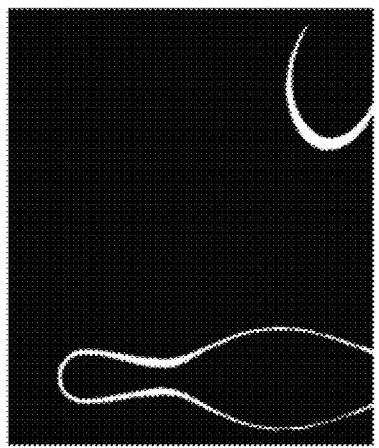
Figure 5C:
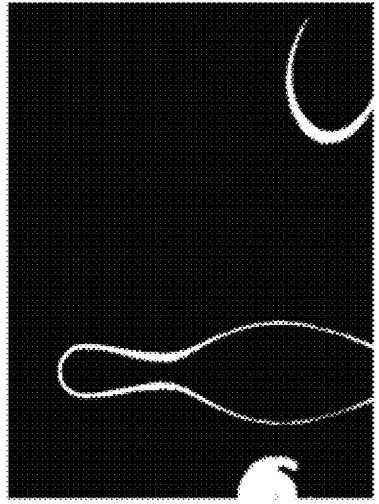
Figure 5D:
Figure 5E:
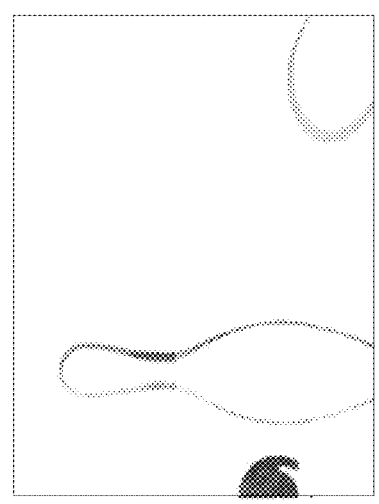
Figure 5F:
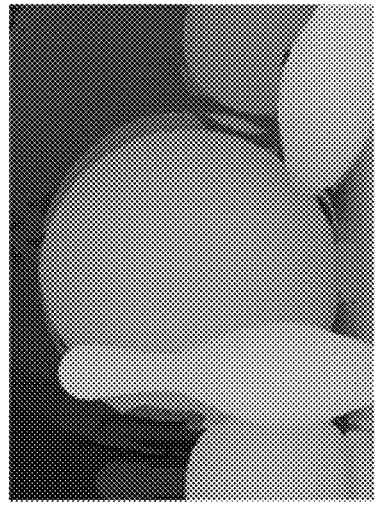

FIGS. 5A through 5F show examples of a sample mask, merged view, and merged disparity map for a given disparity, according to at least some embodiments. FIGS. 5A and 5B show a right mask and left mask, respectively. FIG. 5C shows a merged mask generated from the masks of FIGS. 5A and 5B. FIG. 5D shows a merged view. FIG. 5E shows a masked merged view generated by applying the merged mask of FIG. 5C to the merged view of FIG. 5D. FIG. 5F shows the merged disparity map. Note that only the region corresponding to the merged mask of FIG. 5C is valid (correctly aligned) in the merged view and merged disparity map.

FIGS. 6A and 6B illustrate the left and right views or images of an example original stereo image, respectively. Note that these images, like the other example images in the Figures, have been converted to grayscale from color. The left and right images of FIGS. 6A and 6B may, for example, be combined to produce a painted stereo image or anaglyph, or other 3D image format. A color anaglyph image would be viewed through special (e.g., red/cyan) glasses to obtain the visual effect. FIGS. 7A and 7B illustrate left and right disparity maps, respectively, for the images in FIGS. 6A and 6B, according to at least some embodiments.

Figure 8B:
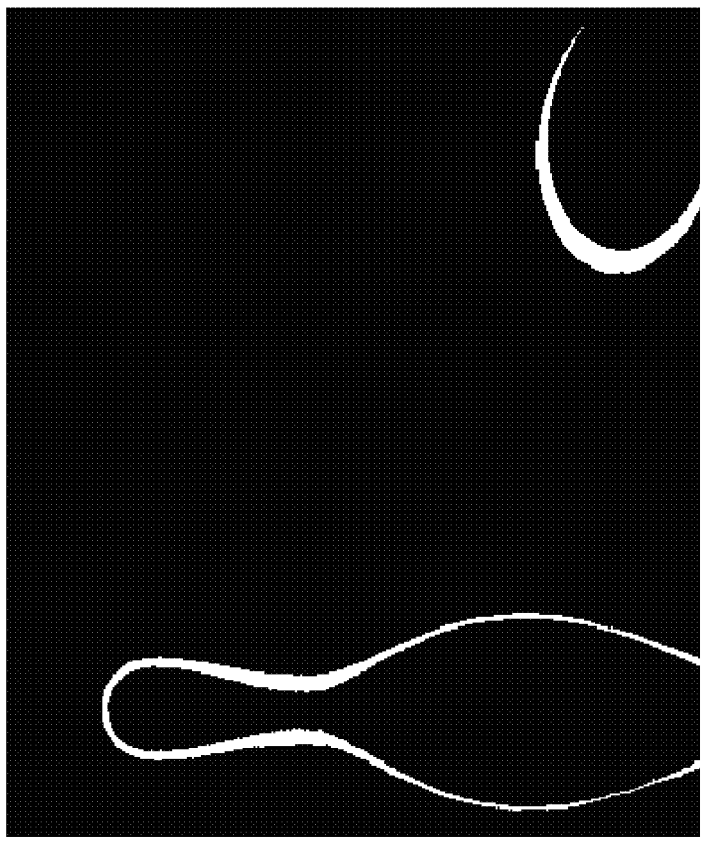
FIGS. 8A and 8B are masks for the left and right images, respectively, that show which parts of the left and right images of FIGS. 6A and 6B have disparities of approximately 37 according to the disparity maps in FIGS. 7A and 7B, according to at least some embodiments.
Figure 8A:
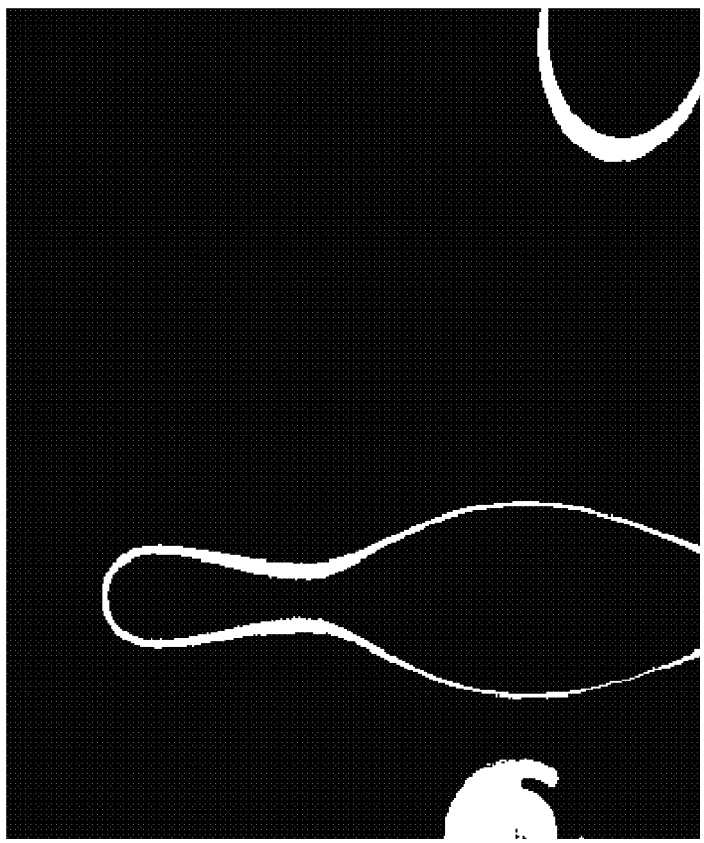
Figure 9:
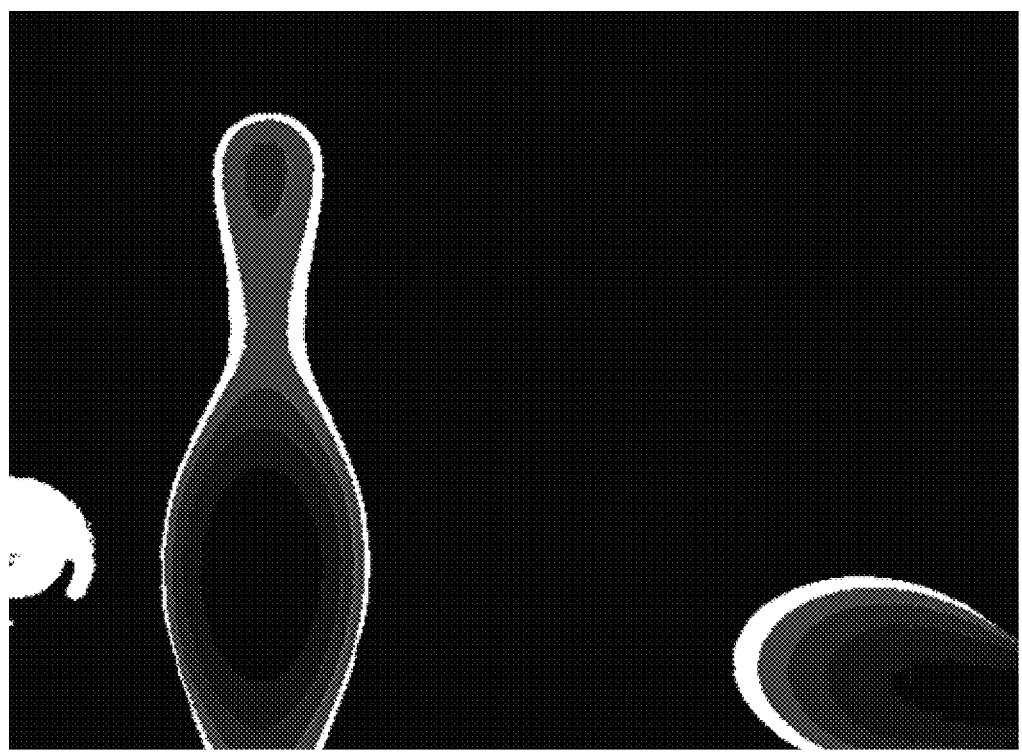
FIG. 9 shows a matched mask at level 37, as well as the overlaid next two closer levels in shades of gray, according to at least some embodiments.

FIGS. 8A and 8B are masks for the left and right images, respectively, that show which parts of the left and right images of FIGS. 6A and 6B have disparities of approximately 37 (which may be referred to as level 37) according to the disparity maps in FIGS. 7A and 7B. The white areas in FIGS. 8A and 8B define areas in the right and left disparity maps that have disparity values at or near 37; this corresponds to the very edge of the left bowling pin, and part of the lying down bowling pin. Because the disparity here is 37, if the right image is shifted 37 pixels to the right, the white areas would line up in these two masks, and the masks can be merged into a larger mask that includes all areas in the left and right images at disparity 37. The result is a matched mask at level 37, as shown in FIG. 9. FIG. 9 shows the matched mask at level 37 as well as the overlaid next two closer levels (e.g., levels 36 and 35) in shades of gray. FIG. 9 thus shows the two masks shown in FIGS. 8A and 8B merged into a single, wider mask. The horizontal offset is 37, the same as the disparity. Overlaid upon this wider mask, in shades of gray, are the next two closer masks at levels 36 and 35.

Figure 10B:
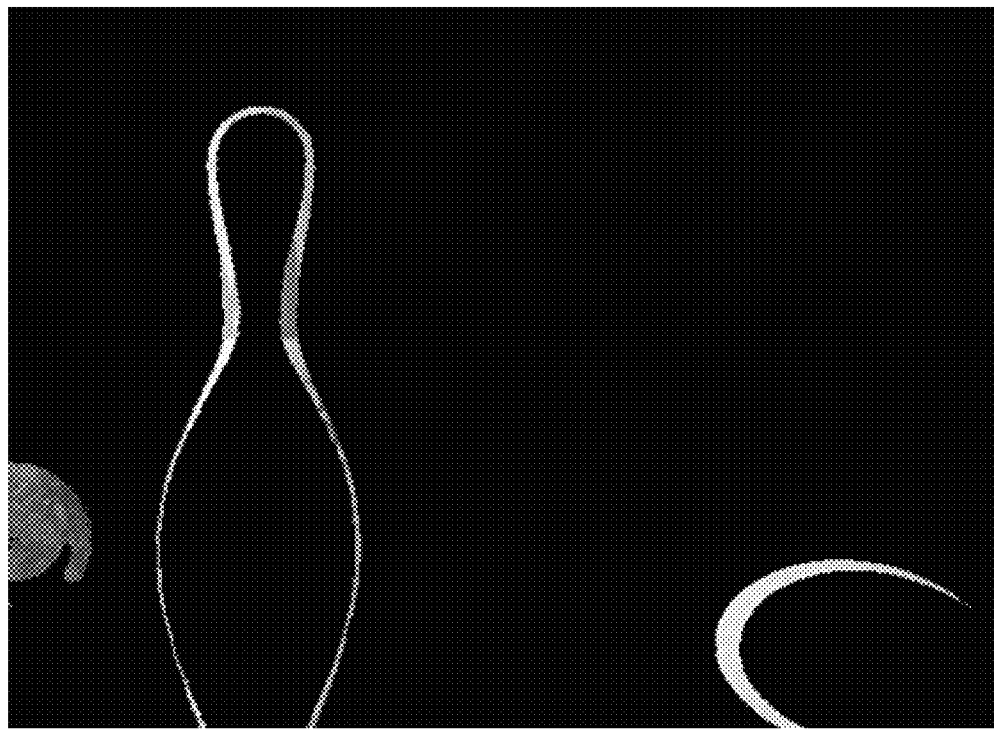
FIG. 10B shows the image of FIG. 10A masked by the matched mask at level 37 shown in FIG. 9, according to at least some embodiments.

FIG. 10A shows a matched image at level 37, which is the original left and right images of FIGS. 6A and 6B overlaid on each other with the same 37-pixel shift. Much of the image in FIG. 10A is nonsense. However, FIG. 10B shows the image of FIG. 10A masked by the matched mask at level 37 shown in FIG. 9. This area shown in FIG. 10B matches up very well, because it is part of the two images where the pixels that represent two views of the same spot on the same object are 37 pixels apart.

Figure 11:
FIG. 11 shows a painted slice at level 37 that results from applying a stylization technique to the portion of the matched image that is within the matched mask for level 37 as shown in FIG. 9, according to at least some embodiments.
Figure 12B:
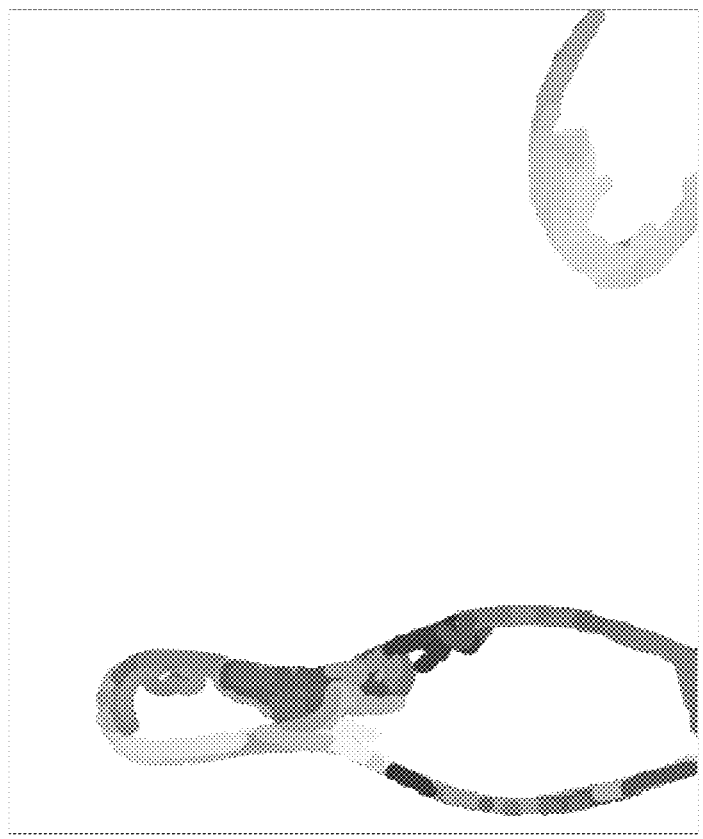
FIGS. 12A and 12B show the left and right painted portions of the painted slice shown in FIG. 11, according to at least some embodiments.
Figure 12A:
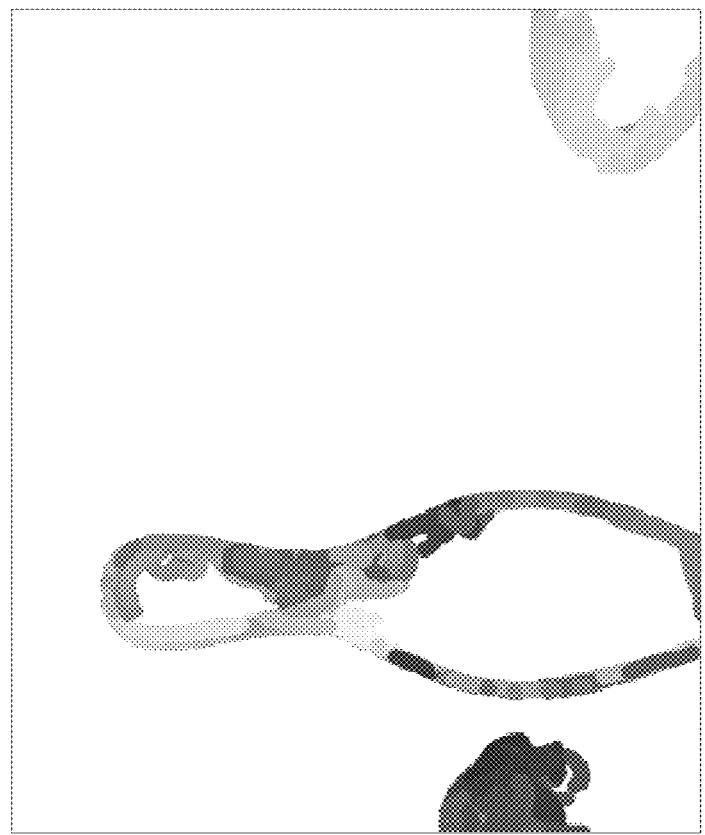

The above may be performed independently for each of a plurality of depth ranges, giving a set of slices of the image each of which is at a small range of depths. A stylization technique (for example, Hertzmann's algorithm, but other techniques may be applied instead or in addition) may then be applied to each slice. FIG. 11 shows a painted slice at level 37, which is the result of applying the stylization technique (in this case, a painting algorithm) to the portion of the matched image that is within the matched mask for level 37 (FIG. 9).

In at least some embodiments, the brush strokes may be allowed to extend into neighboring areas that are represented by the gray areas of the matched mask at level 37 shown in FIG. 9. This may make it easier to achieve full coverage with the brush strokes and may give more freedom to the strokes. Because these neighboring areas are areas that are closer to the viewer, the closer painted layers may ultimately cover them up. In at least some embodiments, strokes are not allowed to extend into areas that are farther away than the masked area, because strokes in those areas may cover up the more distant painted layers. This may allow the stylization technique to be extended into regions and even to use parts of the images from these regions. In at least some embodiments, the stylization technique may only be allowed to use parts of the images within a foreground region. For example, in the example images, the stylization technique may be allowed to use parts of the left bowling pin in these extended regions when enhancing an area of the bowling pin but not of the bowling ball in the background.

Note that the painted slice shown in FIG. 11 is wider than the original image. The left portion corresponds to the areas visible in the left image, and the right portion corresponds to the areas visible in the right image. If the two are separated out, the result is the left and right images shown in FIGS. 12A and 12B, respectively. Note that most, but not all, of the painted area is in both images.

Figure 13B:
FIGS. 13A and 13B show a left stylized image generated by stacking the left painted slices and a right stylized image generated by stacking the right painted slices, respectively, according to at least some embodiments.
Figure 13A:

In at least some embodiments, the stereo image manipulation method may apply this stylization and separation independently for each slice of the input stereo image. Stacking up all the left images yields a left stylized image as illustrated in FIG. 13A, and stacking up all the right images yields a right stylized image as illustrated in FIG. 13B. Note that the images in FIGS. 13A and 13B look like painted or stylized versions of the original left image shown in FIG. 6A and the original right image shown in FIG. 6B. Note that the brush strokes are consistent between the two views shown in FIGS. 13A and 13B; the brush strokes in the two images are exactly the same brush strokes, offset from each other by a distance corresponding to the disparity. The images in FIGS. 13A and 13B may, for example, be combined to form a painted stereo image or anaglyph, or other 3D image format.

Figure 14B:
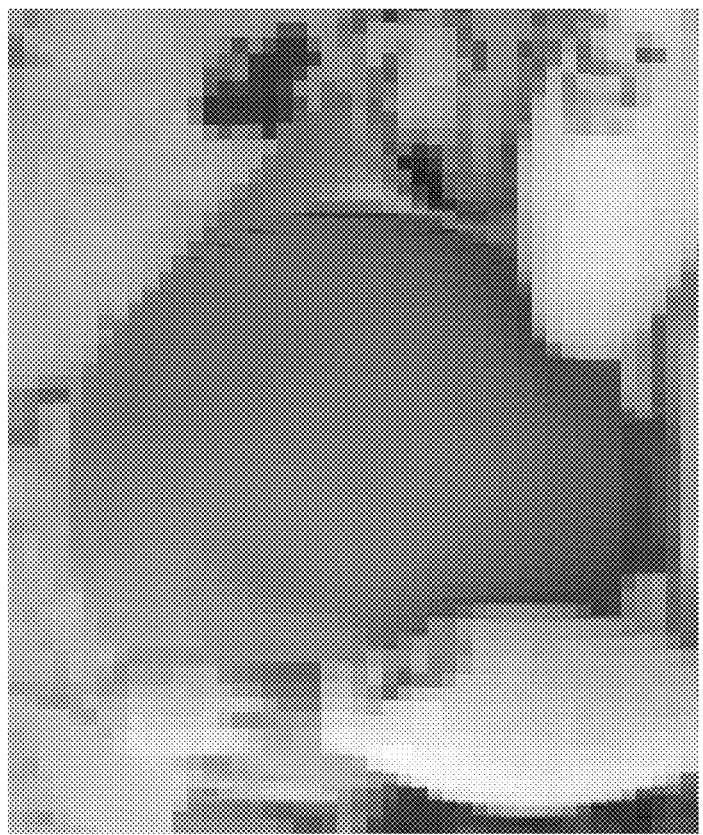
Figure 14A:
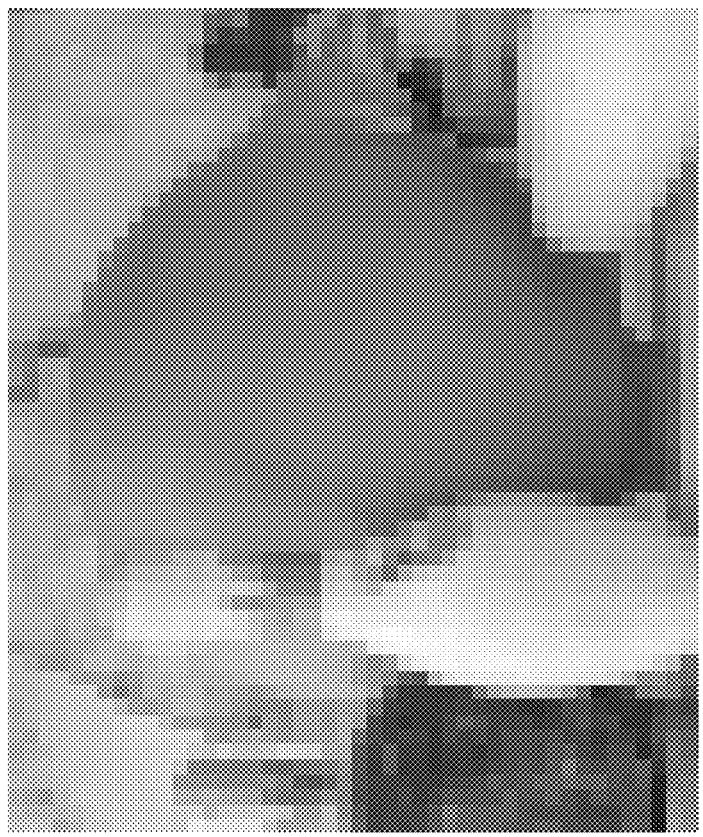
Figure 15B:
Figure 15A:

FIGS. 14A through 16B show some examples of stereo 3D stylization using example digital image processing filters (e.g., Adobe® Photoshop® filters) and the layered approach to stereo image enhancement provided by embodiments of the stereo image manipulation method. Note that all of the example images in these Figures have been converted from color to grayscale for the purpose of this document. FIGS. 14A and 14B show a left painted image and a right painted image, respectively. The filter used for these images is a mosaic filter. FIGS. 15A and 15B show a left painted image and a right painted image, respectively. The filter used for these images is a Pointillist filter. FIGS. 16A and 16B show a left painted image and a right painted image, respectively. The filter used for these images is a rough pastel filter. The images in FIG. 14A-14B, 15A-15B, or 16A-16B may, for example, be combined to form a painted stereo image or anaglyph, or other 3D image format.

Stereo Image Manipulation Method Refinements and Enhancements

In at least some embodiments, to prevent visible layers in the painting (for example, strokes along a spherical surface appear as concentric rings creating a layered paper cutout effect) and to introduce roughness, strokes may be permitted to travel into areas whose depth is within a user-specified tolerance or range of the current depth level. This also enables longer strokes to be produced, since strokes do not have to strictly adhere to the masked region.

Some stylization techniques, such as Hertzmann's algorithm, may use the image derivatives and edges to direct strokes along painting features in an attempt to mimic the hand of a real artist. However, there may be no distinction between surface and pattern boundaries, so strokes often go in unexpected or unnatural directions. In at least some embodiments, since the disparity map is available, surface information is available and can be used to affect stroke direction. However, instead of using the disparity map to control stroke direction, embodiments may use the disparity map to enhance stroke direction, in particular, around surface boundaries. In at least some embodiments, this may be performed by computing the edges of the disparity map, applying a median filter to soften and spread the influence of strong edges, and then adding it to the input image prior to computing the input's derivative. This effectively enhances surfaces and their boundaries while keeping strong pattern boundaries intact.

In at least some embodiments, when choosing the next direction for a stroke to travel, two choices may be provided: the surface-enhanced direction, and, the direction from the pure disparity map. If one direction produces an invalid location, then the other is selected. However, if both directions produce valid points, then direction corresponding to the largest magnitude (strongest image/surface feature) may be selected.

The effect of these last two enhancements can be seen in the example final painted images shown in FIGS. 10A and 10B by comparing the brush work around the edges of the balls and pins, and the brush work around surface details of the standing pin. In the original images shown in FIGS. 2A and 2B, there is no difference between the sharp boundaries between the edges of the objects, and the sharp boundaries separating different colors on the surface of the pin. However, the depth information provides this difference, and thus allows embodiments of the stereo image manipulation method to generate brush strokes that closely follow the object boundaries, while allowing looser brush work for the surface detail.

Embodiments of the stereo image manipulation method have been described herein in relation to using Hertzmann's algorithm or variations thereof as an image stylization technique. However, there are many other image stylization techniques. Embodiments of the stereo image manipulation method may be used to produce stylized stereo images using any stylization technique. However, some stylization techniques may produce undesirable artifacts at masked edges. In at least some embodiments, to avoid this problem of undesirable artifacts at masked edges, the stylization technique may be applied to a larger range of depth, including parts of the image that are slightly closer or farther away than the area of the slice, and then the mask may be applied to the result. However, in at least some embodiments, this would not be done in cases where extending the range crossed over object boundaries (depth discontinuities), because this would allow different objects to affect the stylization of the area being considered (e.g. allowing the background color to affect the way the edge of the bowling ball was stylized in the example images shown in the Figures).

Non-Uniform Stylization

In at least some embodiments of the stereo image manipulation method, a single stylization can be applied uniformly across all mask view layers, or different stylizations or combinations thereof can be applied at different layers. Combining multiple filters or using different parameters can produce some interesting and desirable results. For example, a depth of field effect may be created by applying a Gaussian blur to each layer with a different kernel size, width, etc. at different layers. The focal point and depth can be adjusted by changing the blurring parameters applied to each layer. One could also apply different stylization techniques to different depth ranges in the image, for example, by applying stylization to the background while leaving the foreground unchanged.

Figure 17A:
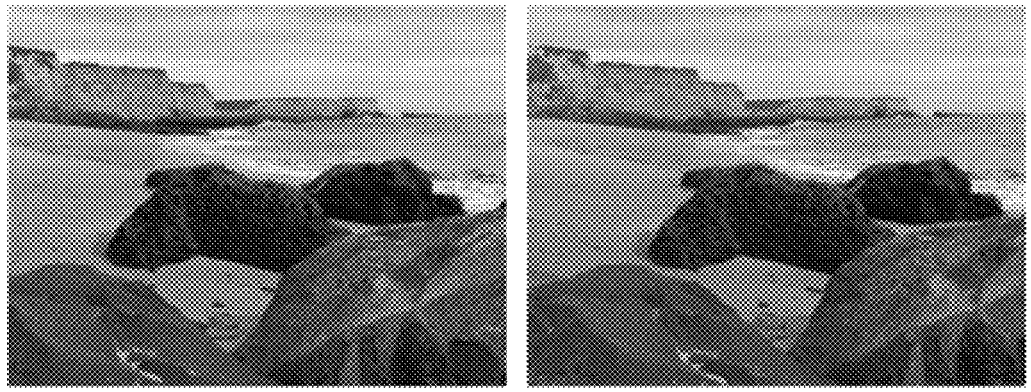
FIGS. 17A and 17B illustrate an example in which different blurs are applied at different layers, according to at least some embodiments of the stereo image manipulation method.
Figure 17B:
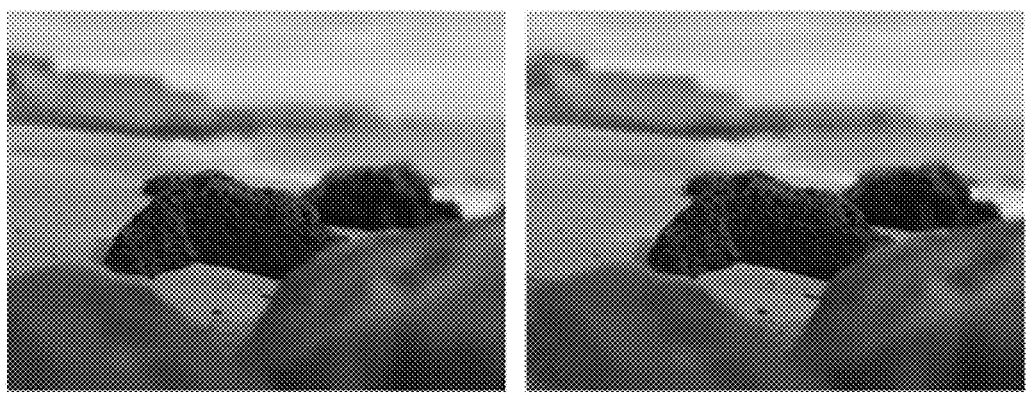

FIGS. 17A and 17B illustrate an example in which different blurs are applied at different layers, according to at least some embodiments of the stereo image manipulation method. FIG. 17A shows an original right and left image of a stereo image pair, and FIG. 17B shows the right and left image after selectively applying a blur at some of the depth layers using an embodiment of the stereo image manipulation method as described above. Note that the left and right views are interesting by themselves; they do not need to be viewed in stereo to see the effect. Using a stereo image with its depth/disparity information as input enables types of stylization that would be difficult or impossible with just a single input image, even if the end result is a single image.

Synthesizing Intermediate Viewpoints

Figure 4:
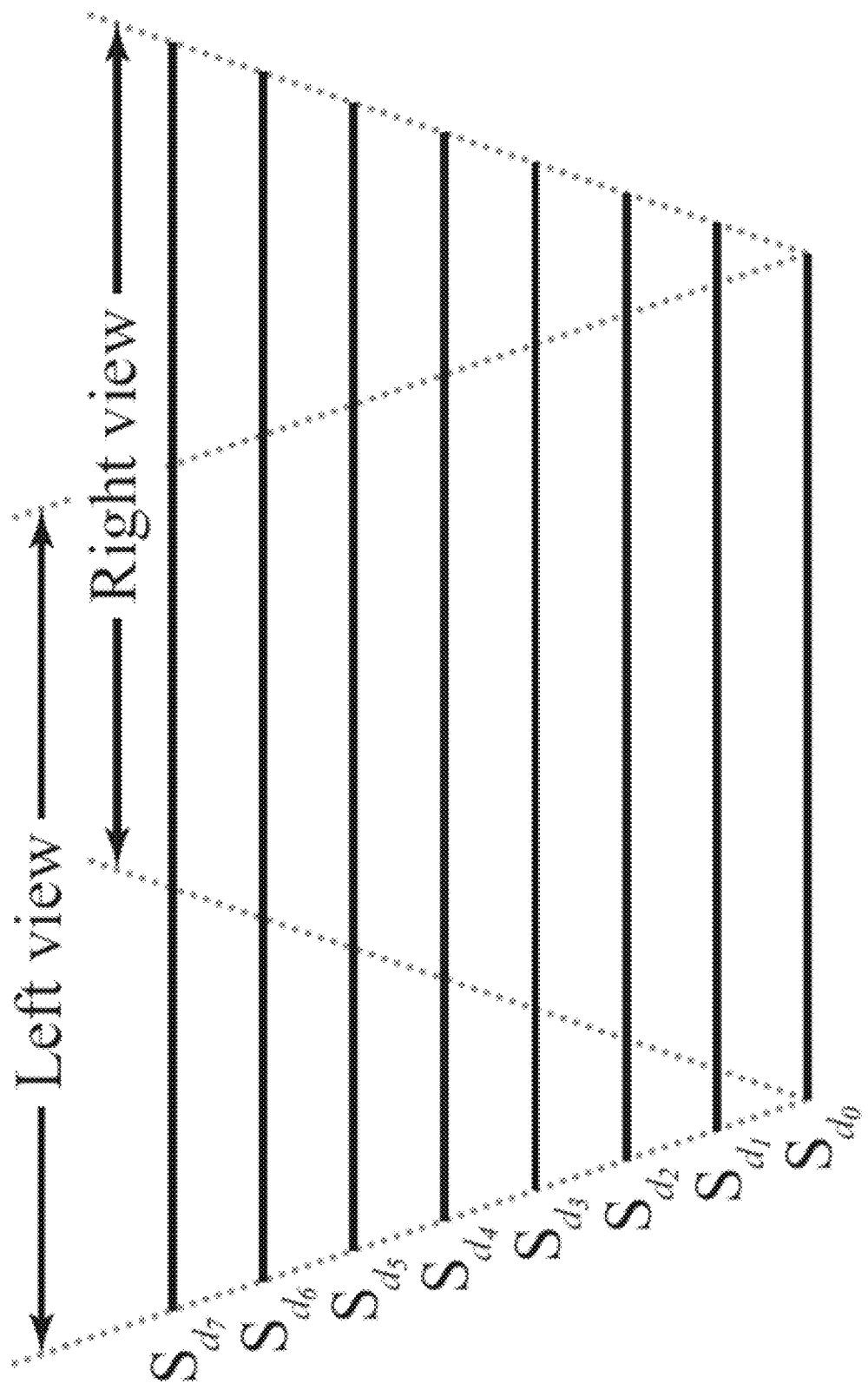
FIG. 4 shows a stack of stylized layers, viewed from their top edges, according to at least some embodiments.

Embodiments of the stereo image manipulation method may use the leftmost and rightmost w pixels of each layer to construct the new left and right views, as shown in FIG. 4. However, in at least some embodiments, other sets of w pixels can be used to synthesize other viewpoints. For example, by taking the middle w pixels, a view may be synthesized that is halfway between the left and right views; this would correspond to taking a vertical slice through the center of the stack shown in FIG. 4. Other sets of pixels can be used to synthesize other viewpoints. This can be done with or without stylizing the layers. Note that some information may be missing from a view so constructed because there are some areas of the scene that would be visible from the viewpoint (e.g., the center viewpoint) being synthesized that are not visible in either the left or right views. An image processing tool or technique, for example an inpainting tool or technique, may be used to fill these areas.

Some glasses-free stereoscopic displays require some number of intermediate views between the leftmost and rightmost viewpoints. The method described above can be used to provide those views by synthesizing images at one or more intermediate viewpoints. The method can also be used to reduce the inter-ocular separation for a stereo photograph. Close-up photographs taken with a stereo camera can be difficult to view, since fusing the image is equivalent to focusing on an object that is right in front of the viewer's eyes. Reducing the separation can improve the viewing comfort for such images.

Applying Stylization to the Merged Image to Reduce Layering Artifacts

The method for stereoscopic 3D stylization as described above in reference to FIGS. 2 and 3 separates image pixels of a particular disparity from the rest of the image prior to stylization. However, this can produce visible layers in the final image for filters that require global image information because individual layers may contain only partial information.

Figure 18:
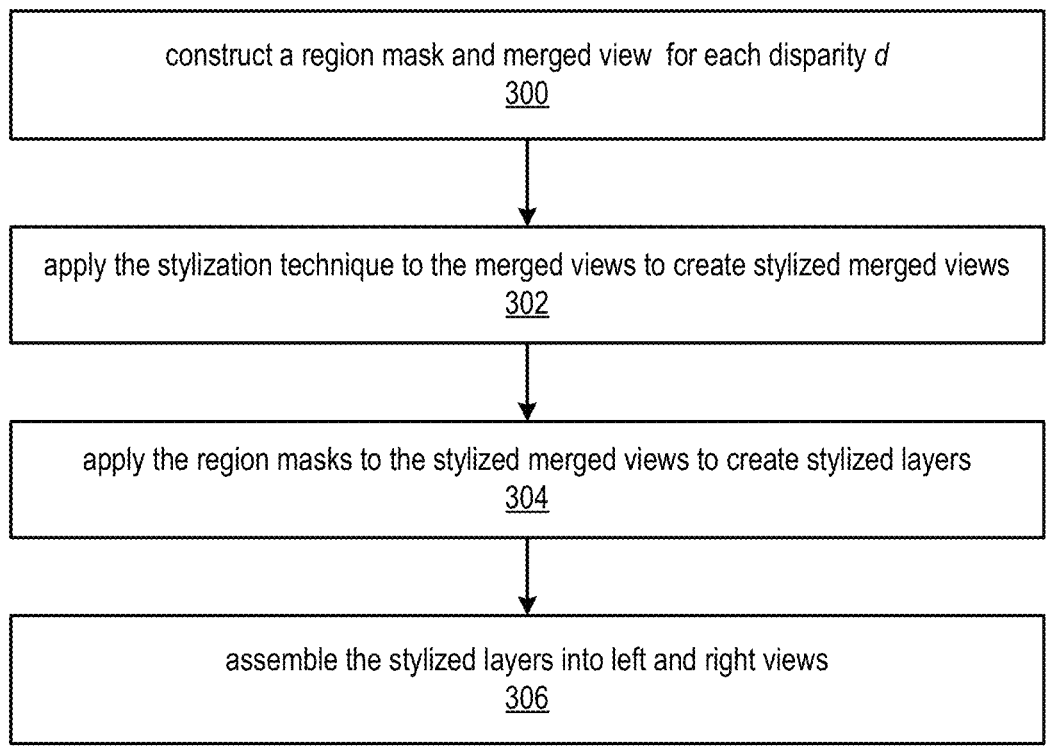
FIG. 18 illustrate a method for stereoscopic 3D stylization that stylizes the merged images prior to separating image pixels of a particular disparity from the rest of the image, according to at least some embodiments.

To overcome this problem, in at least some embodiments, the merged images may be stylized prior to separating out the pixels of a particular disparity. This folds more global image information into each stylization step, thus reducing or eliminating banding artifacts. FIG. 18 illustrate a method for stereoscopic 3D stylization that stylizes the merged images prior to separating image pixels of a particular disparity from the rest of the image, according to at least some embodiments. As indicated at 300, the region mask $M_d$ and merged view $V_d$ may be computed for each disparity d. As indicated at 302, the stylization filter may be applied to each $V_d$ to create stylized merged views $V'_d$. As indicated at 304, the region masks $M_d$ may be applied to the stylized merged views to create the stylized layers $S_d$. As indicated at 308, the stylized layers may then be assembled into left and right stylized views.

Figure 19A:
FIGS. 19A and 19B illustrate applying stylization to the merged image to reduce layering artifacts, according to at least some embodiments.
Figure 19B:

FIGS. 19A and 19B illustrate applying stylization to the merged images prior to separating out the pixels at the disparity levels to reduce layering artifacts, according to at least some embodiments. In generating these images, a filter was used that requires global image information. The right and left views shown in FIG. 19A were generated according to an embodiment of a method for stereoscopic 3D stylization as described above in reference to FIGS. 2 and 3 that separates image pixels of a particular disparity from the rest of the image prior to stylization. Note the visible layers in these images. The right and left views shown in FIG. 19B were generated according to an embodiment of a method for stereoscopic 3D stylization as described above in reference to FIG. 18 that stylizes the merged images prior to separating image pixels of a particular disparity from the rest of the image. Note that the layering artifacts that are clearly visible in FIG. 19A are not present in FIG. 19B.

Example Implementations

Some embodiments may include a means for coherent manipulation and stylization of stereoscopic images. For example, a stereo image manipulation module may receive or obtain input identifying a stereo image pair and a disparity map for the stereo image pair, use the disparity map for a stereo image pair to divide the left and right images into a set of slices, merge the left and right slices for a depth into a single image, apply a stylization technique to each slice, extract the left and right portions of each stylized slice, and stack the left and right portions together to create a coherent stylized stereo image as described herein. In at least some embodiments, as an alternative to first extracting slices from a merged image and then applying a stylization technique to the slices, the stereo image manipulation module may first apply the stylization technique to the merged image and then extract slices from the stylized merged image.

The stereo image manipulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving or obtaining input identifying a stereo image pair and a disparity map for the stereo image pair, using the disparity map for a stereo image pair to divide the left and right images into a set of slices, merging the left and right slices for a depth into a single image, applying a stylization technique to each slice, extracting the left and right portions of each stylized slice, and stacking the left and right portions together to create a coherent stylized stereo image, as described herein. In at least some embodiments, as an alternative to first extracting slices from a merged image and then applying a stylization technique to the slices, the computer-readable storage medium may store program instructions executable by the one or more processors to cause the computing apparatus to perform first applying the stylization technique to the merged image and then extracting slices from the stylized merged image. Other embodiments of the stereo image manipulation module or method may be at least partially implemented by hardware circuitry and/or firmware stored, for example, in a non-volatile memory.

Figure 20:
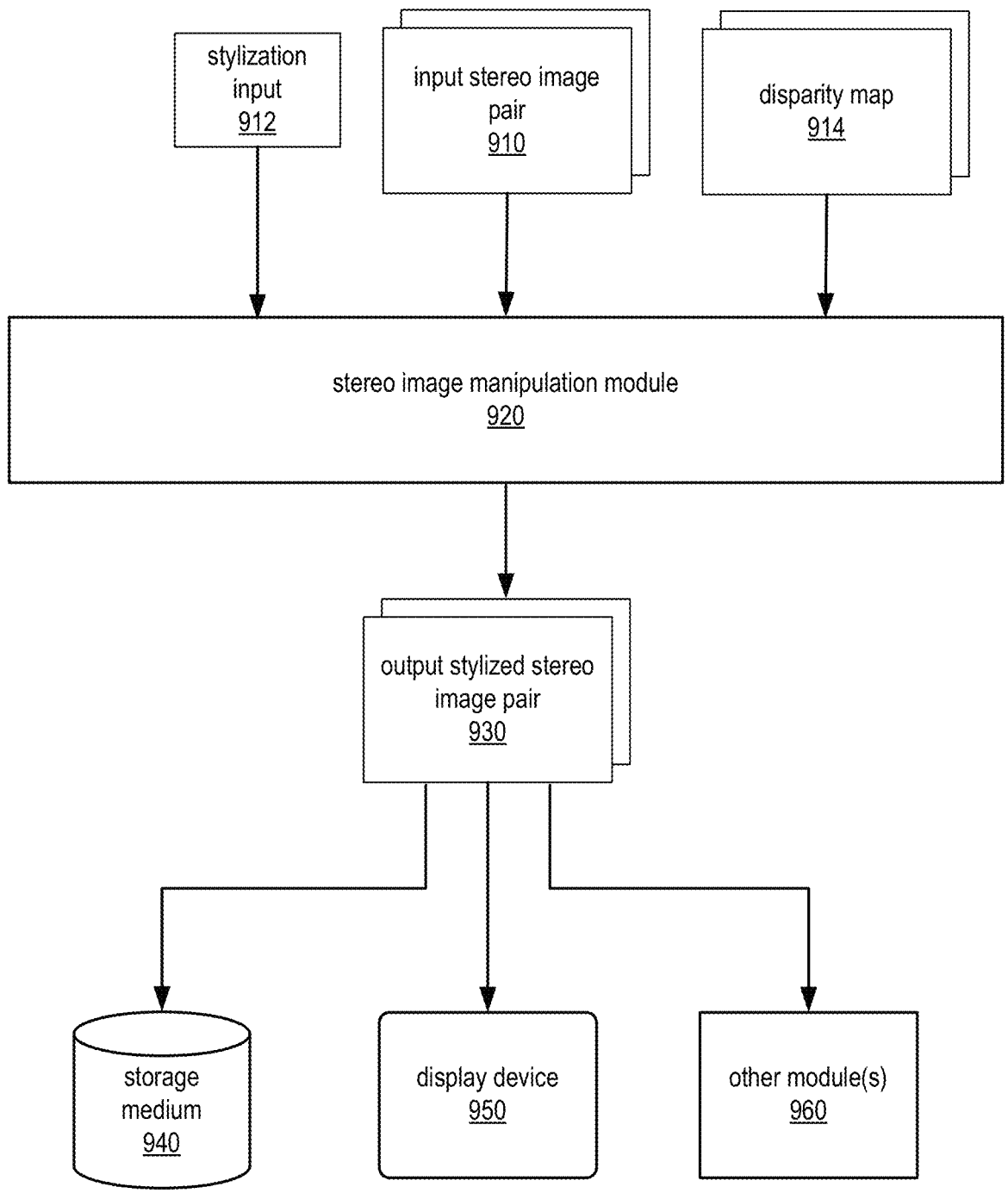
FIG. 20 illustrates a module that may implement a stereo image manipulation method, according to some embodiments.
Figure 21:
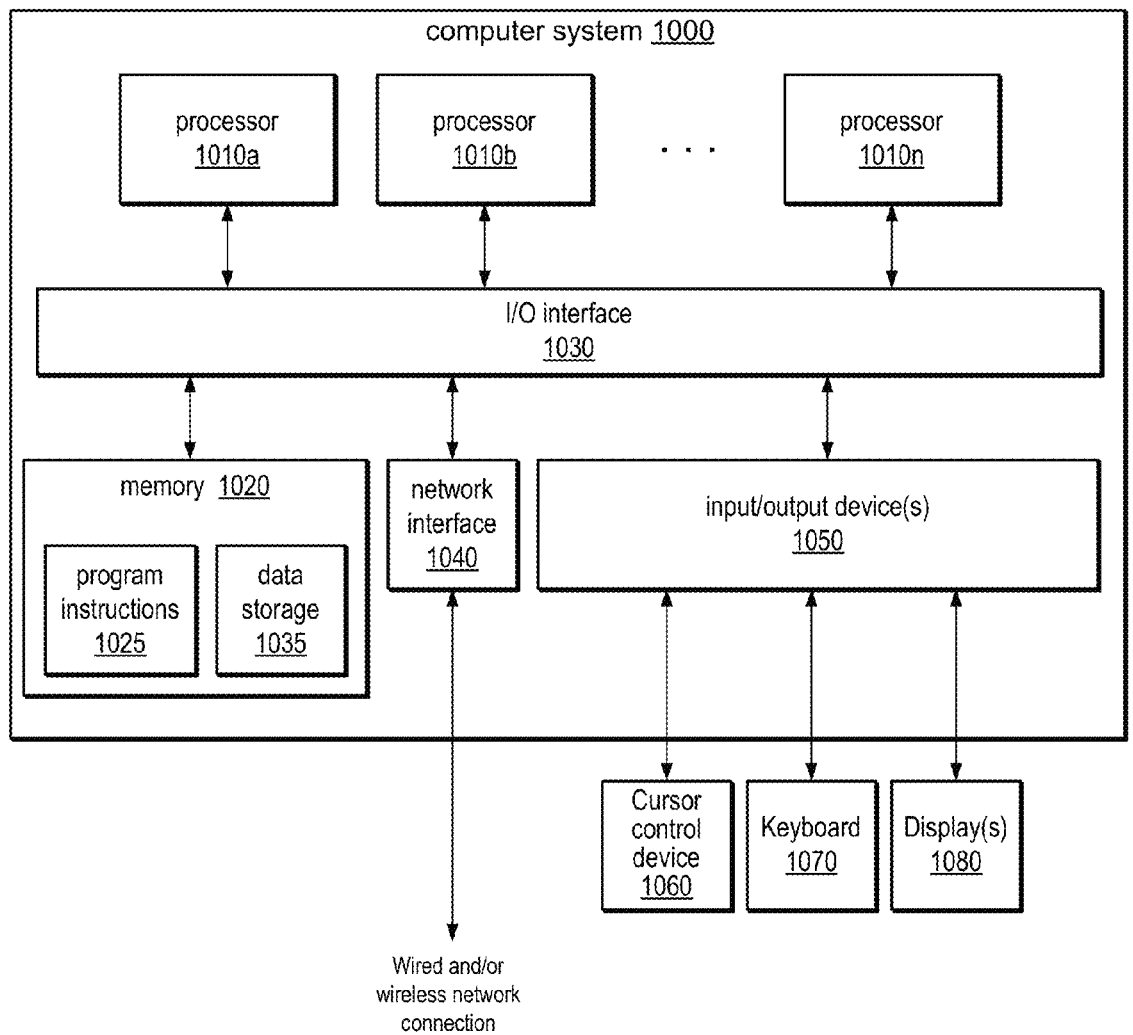
FIG. 21 illustrates an example computer system that may be used in embodiments.

Embodiments of the stereo image manipulation method and/or of the various techniques described as parts of the stereo image manipulation method as described herein may be implemented in software, hardware, or a combination thereof. For example, embodiments of the stereo image manipulation method may be performed by a stereo image manipulation module implemented by program instructions stored in a computer-readable storage medium and executable by one or more processors (e.g., one or more CPUs or GPUs). Embodiments of a stereo image manipulation module may, for example, be implemented as a stand-alone application, as a module of an application, as a plug-in for applications including image or video processing applications, and/or as a library function or functions that may be called by other applications such as image processing or video processing applications. Embodiments of the stereo image manipulation module may be implemented in any image or video processing application, or more generally in any application in which stereo images may be processed. Example applications in which embodiments may be implemented may include, but are not limited to, Adobe® Photoshop® technology applications. "Adobe" and "Photoshop" are either registered trademarks or trademarks of Adobe® Systems Incorporated in the United States and/or other countries. An example stereo image manipulation module that may implement the stereo image manipulation methods as described herein is illustrated in FIG. 20. An example computer system on which a stereo image manipulation module may be implemented is illustrated in FIG. 21.

In addition to computer system implementations, embodiments of the stereo image manipulation methods and module as described herein may be implemented in other devices, for example in digital cameras or mobile devices such as smart phones and pad devices, for enhancement of captured stereo image pairs, as a software module, hardware module, or a combination thereof.

FIG. 20 illustrates a stereo image manipulation module that may implement one or more of the stereo image manipulation methods as illustrated in FIGS. 2 through 19B. FIG. 21 illustrates an example computer system on which embodiments of module 920 may be implemented. Module 920 may receive as input a stereo image pair 910 and disparity map 914 for the stereo image pair. An example input stereo image pair is shown in FIGS. 6A and 6B, and example disparity maps are shown in FIGS. 7A and 7B. Module 920 may then use the disparity maps to segment the left and right images into planes, each plane representing the portion of the images that are at a particular, small range of depths. Module 920 may then, at two or more depths, merge the left and right segments into a single image for that depth, using the disparity to determine their horizontal offset. Module 920 may receive stylization input 912 according to a stylization technique, for example one or more brush strokes or stylization filter input. Module 920 applies the stylization technique independently to each depth layer according to stylization input 912, as described herein. Module 920 reassembles the stylized layers to form a pair of stylized images 930 as output. An example stylized stereo image pair is shown in FIGS. 13A and 13B. Stylized stereo image pair 930 may, for example, be stored to a storage medium 940, such as system memory, a disk drive, DVD, CD, etc., displayed on a display device 950, and/or passed to one or more other modules 960 for additional processing. Stylized stereo image pair 930 may, for example, be combined to form a painted stereo image or anaglyph, or other 3D image format.

In at least some embodiments, instead of or as an alternative to first extracting slices from a merged image and then applying a stylization technique to the slices, the stereo image manipulation module 920 may first apply the stylization technique to the merged image and then extract slices from the stylized merged image as illustrated in FIGS. 18 and 19B.

In some embodiments, stereo image manipulation module 920 may provide one or more interfaces via which another entity (e.g., a user or another module) may interact with the module 920, for example to specify one or more parameters of or inputs to the stereo image manipulation method as described herein.

Example System

Embodiments of the stereo image manipulation methods or module as described herein may be executed on one or more computer systems, which may interact with various other devices. One such computer system is illustrated by FIG. 21. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the stereo image manipulation methods or module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 21, memory 1020 may include program instructions 1025, configured to implement embodiments of the stereo image manipulation methods as described herein, and data storage 1035, comprising various data accessible by program instructions 1025. In one embodiment, program instructions 1025 may include software elements of embodiments of the stereo image manipulation methods or module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the stereo image manipulation methods or module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices:
receiving a stereo image pair comprising a left image and a right image;
responsive to receiving the stereo image pair, obtaining a disparity map for the stereo image pair based on differences between the left image and the right image;
for each of a plurality of depth ranges indicated by the disparity map, generating a merged image that includes image data from the left image and image data from the right image at the respective depth range; and generating a new stereo image pair comprising a new left image and a new right image from one or more of the plurality of merged images.

2. The method as recited in claim 1, further comprising applying a stylization technique to at least one of the one or more merged images prior to said generating a new stereo image pair.

3. The method as recited in claim 2, wherein said applying a stylization technique to at least one of the one or more merged images comprises, for each of the at least one of the one or more merged images:
extracting a slice image from the respective merged image at a particular depth as indicated by the disparity map; and
applying the stylization technique to the slice image to generate a stylized slice image.

4. The method as recited in claim 2, wherein said applying a stylization technique to at least one of the one or more merged images comprises, for each of the at least one of the one or more merged images:
applying the stylization technique to the respective merged image to generate a stylized merged image; and
extracting a stylized slice image from the stylized merged image at a particular depth.

5. The method as recited in claim 2, further comprising applying a different stylization technique to at least one other of the one or more merged images prior to said generating a new stereo image pair.

6. The method as recited in claim 1, wherein said generating a new stereo image pair comprising a new left image and a new right image from one or more of the plurality of merged images comprises:
extracting a slice image from each of the one or more merged images at a particular depth as indicated by the disparity map;
extracting a leftmost portion from each of the one or more slice images and stacking the one or more leftmost portions to generate the new left image; and
extracting a rightmost portion from each of the one or more slice images and stacking the one or more rightmost portions to generate the new right image.

7. The method as recited in claim 1, further comprising:
extracting a slice image from each of the one or more merged images at a particular depth as indicated by the disparity map;
extracting a portion from each of the one or more slice images and stacking the one or more portions to generate an intermediate image between the left image and the right image.

8. The method as recited in claim 1, wherein the disparity map indicates a disparity for each pixel in the stereo image pair, wherein each disparity indicates an offset from a corresponding pixel in the left image or the right image, and wherein each disparity corresponds to a particular depth in the stereo image pair.

9. A system, comprising:
one or more processors; and
a memory comprising program instructions, wherein the program instructions are executable by the at least one of the one or more processors to:
receive a stereo image pair comprising a left image and a right image;
responsive to receiving the stereo image pair, obtain a disparity map for the stereo image pair based on differences between the left image and the right image;
for each of a plurality of depth ranges indicated by the disparity map, generate a merged image that includes image data from the left image and image data from the right image at the respective depth range; and generate a new stereo image pair comprising a new left image and a new right image from one or more of the plurality of merged images.

10. The system as recited in claim 9, wherein the program instructions are further executable by the at least one of the one or more processors to apply a stylization technique to at least one of the one or more merged images prior to said generating a new stereo image pair.

11. The system as recited in claim 10, wherein, to apply a stylization technique to at least one of the one or more merged images, the program instructions are executable by the at least one of the one or more processors to, for each of the at least one of the one or more merged images:

extract a slice image from the respective merged image at a particular depth as indicated by the disparity map; and apply the stylization technique to the slice image to generate a stylized slice image.

12. The system as recited in claim 10, wherein, to apply a stylization technique to at least one of the one or more merged images, the program instructions are executable by the at least one of the one or more processors to, for each of the at least one of the one or more merged images:

apply the stylization technique to the respective merged image to generate a stylized merged image; and extract a stylized slice image from the stylized merged image at a particular depth.

13. The system as recited in claim 10, wherein the program instructions are executable by the at least one of the one or more processors to apply a different stylization technique to at least one other of the one or more merged images prior to said generating a new stereo image pair.

14. The system as recited in claim 9, wherein, to generate a new stereo image pair comprising a new left image and a new right image from one or more of the plurality of merged images, the program instructions are executable by the at least one of the one or more processors to:

extract a slice image from each of the one or more merged images at a particular depth as indicated by the disparity map;

extract a leftmost portion from each of the one or more slice images and stack the one or more leftmost portions to generate the new left image; and extract a rightmost portion from each of the one or more slice images and stack the one or more rightmost portions to generate the new right image.

15. A non-transitory computer-readable storage medium storing program instructions, wherein the program instructions are computer-executable to implement:

receiving a stereo image pair comprising a left image and a right image;

responsive to receiving the stereo image pair, obtaining a disparity map for the stereo image pair based on differences between the left image and the right image;

for each of a plurality of depth ranges indicated by the disparity map, generating a merged image that includes image data from the left image and image data from the right image at the respective depth range; and generating a new stereo image pair comprising a new left image and a new right image from one or more of the plurality of merged images.

16. The non-transitory computer-readable storage medium as recited in claim 15, wherein the program instructions are further computer-executable to implement applying a stylization technique to at least one of the one or more merged images prior to said generating a new stereo image pair.

17. The non-transitory computer-readable storage medium as recited in claim 16, wherein, in said applying a stylization technique to at least one of the one or more merged images, the program instructions are computer-executable to implement, for each of the at least one of the one or more merged images:

extracting a slice image from the respective merged image at a particular depth as indicated by the disparity map; and applying the stylization technique to the slice image to generate a stylized slice image.

18. The non-transitory computer-readable storage medium as recited in claim 16, wherein, in said applying a stylization technique to at least one of the one or more merged images, the program instructions are computer-executable to implement, for each of the at least one of the one or more merged images:

applying the stylization technique to the respective merged image to generate a stylized merged image; and extracting a stylized slice image from the stylized merged image at a particular depth.

19. The non-transitory computer-readable storage medium as recited in claim 16, wherein the program instructions are further computer-executable to implement applying a different stylization technique to at least one other of the one or more merged images prior to said generating a new stereo image pair.

20. The non-transitory computer-readable storage medium as recited in claim 15, wherein, in said generating a new stereo image pair comprising a new left image and a new right image from one or more of the plurality of merged images, the program instructions are computer-executable to implement:

extracting a slice image from each of the one or more merged images at a particular depth as indicated by the disparity map;

extracting a leftmost portion from each of the one or more slice images and stacking the one or more leftmost portions to generate the new left image; and extracting a rightmost portion from each of the one or more slice images and stacking the one or more rightmost portions to generate the new right image.

* * * * *